United States Patent [19]

Spivey, Jr.

[11] 4,248,134
[45] Feb. 3, 1981

[54] RESET MEANS FOR FLUID CONTROL CIRCUIT

[75] Inventor: William J. Spivey, Jr., Joliet, Ill.

[73] Assignee: Caterpillar Tractor Co., Peoria, Ill.

[21] Appl. No.: 945,262

[22] Filed: Sep. 25, 1978

[51] Int. Cl.³ ............................................ F15B 13/042
[52] U.S. Cl. ............................................ 91/29; 91/38;
91/446; 91/454; 91/461; 137/596.14
[58] Field of Search ............... 91/29, 446, 461, 454,
91/38, 424; 137/596.14

[56] References Cited

U.S. PATENT DOCUMENTS

| | | | |
|---|---|---|---|
| 1,947,727 | 2/1934 | McCune | 91/38 |
| 2,619,073 | 11/1952 | Brooks et al. | 91/38 |
| 3,170,484 | 2/1965 | Benz et al. | 91/424 X |
| 3,428,084 | 2/1969 | Carls | 91/424 X |
| 3,552,266 | 1/1971 | Tanenblatt | 91/424 X |
| 3,605,554 | 9/1971 | Philbrick | 91/38 |
| 3,608,583 | 9/1971 | Huntington | 137/596.14 X |
| 3,952,514 | 4/1976 | Habiger | 60/445 |
| 3,996,743 | 12/1976 | Habiger et al. | 60/431 |
| 4,051,764 | 10/1977 | Murata | 91/29 |

FOREIGN PATENT DOCUMENTS

| | | | |
|---|---|---|---|
| 2232664 | 1/1974 | Fed. Rep. of Germany | 91/454 |
| 1322897 | 2/1963 | France | 91/424 |

Primary Examiner—Irwin C. Cohen
Attorney, Agent, or Firm—Phillips, Moore, Weissenberger, Lempio & Majestic

[57] ABSTRACT

A control circuit comprises pressurized fluid source (11), a two-position directional control valve (14) and an actuator (13), such as the pump of a hydrostatic transmission, connected to the fluid source and the control valve to be selectively actuated thereby. Relay valves (17, 18, 19) are interconnected in the control circuit to sequentially (A) prevent communication of pressurized fluid from the source to the actuator upon activation of the source and when the control valve is maintained in its first position, (B) communicate pressurized fluid from the source to the actuator upon continued activation of the source and when the control valve is moved from its first position to a second position thereof, and (C) prevent communication of pressurized fluid from the source to the actuator when the source is deactivated and then reactivated with the control valve being maintained in its second position whereby the control valve must be first returned to its first position and then moved to its second position before pressurized fluid can be communicated to the actuator for actuation thereof.

16 Claims, 3 Drawing Figures

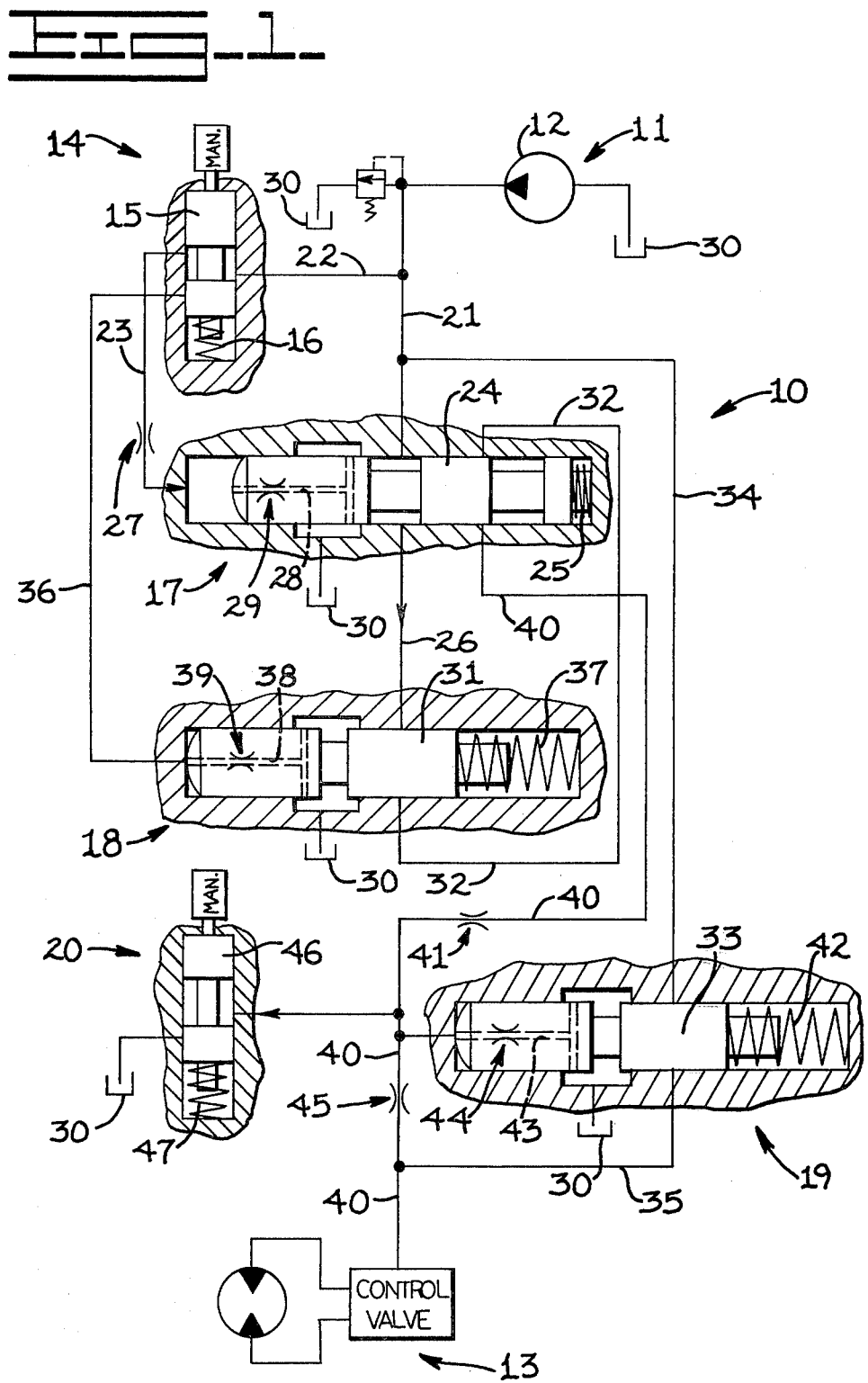

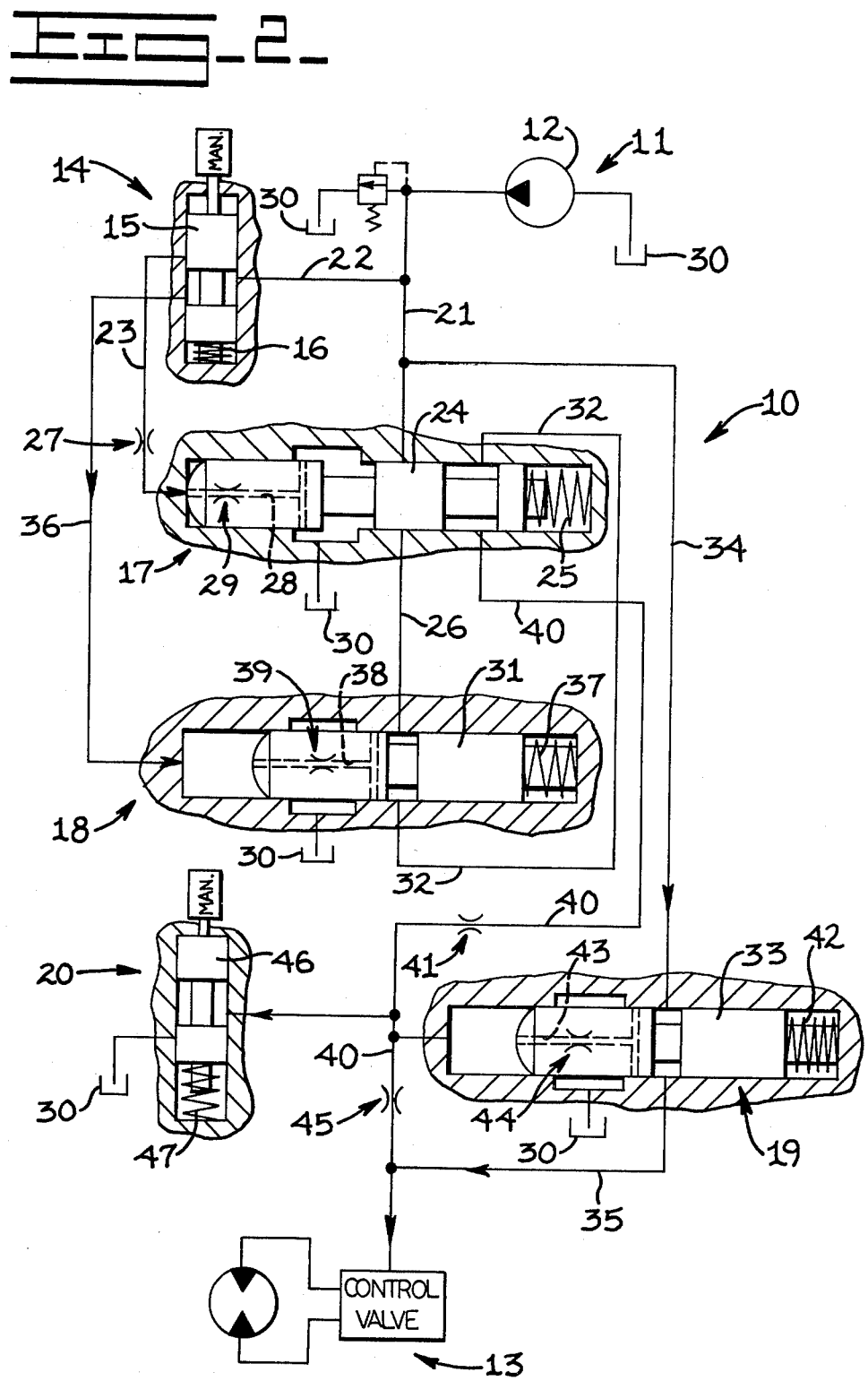

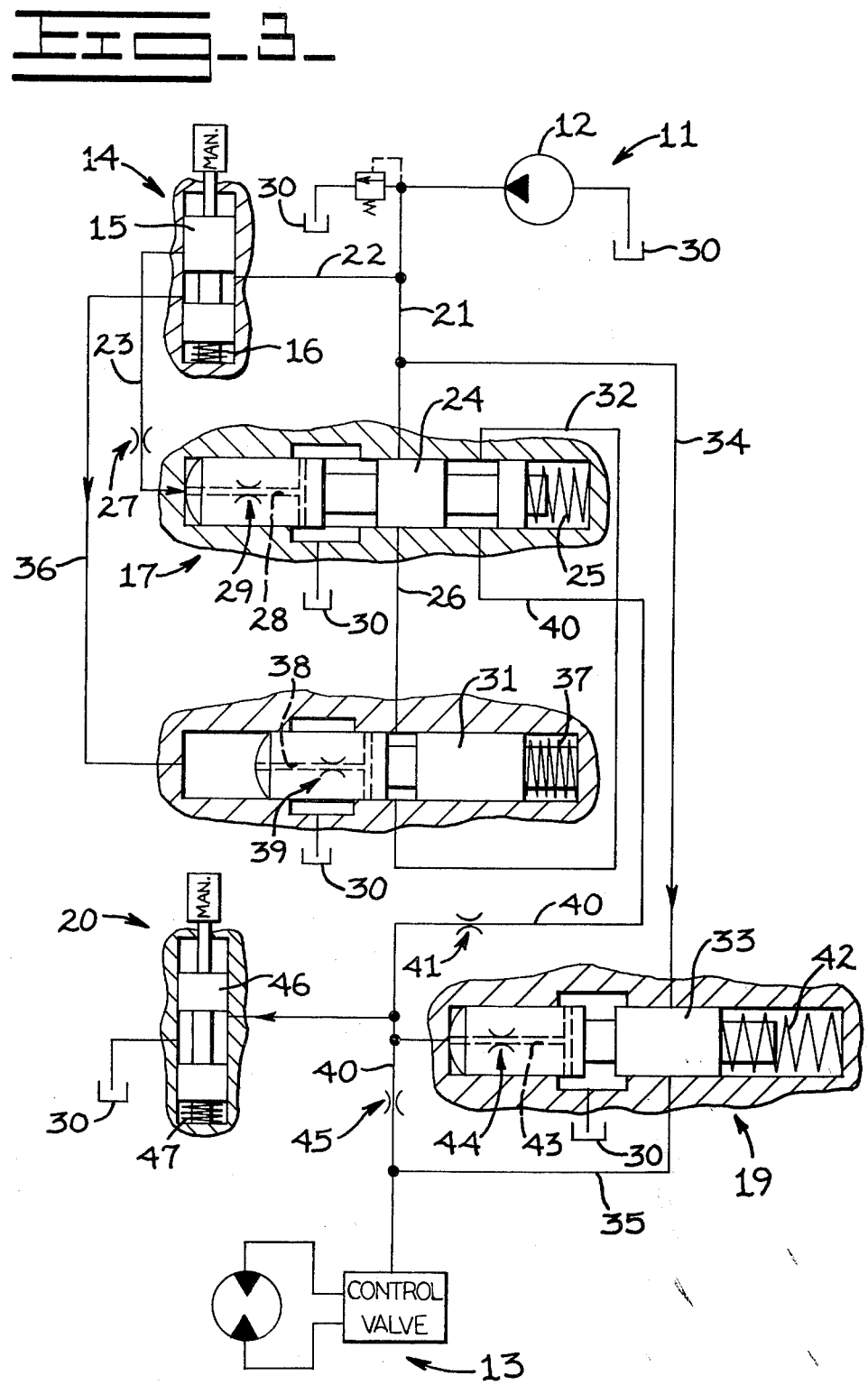

RESET MEANS FOR FLUID CONTROL CIRCUIT

TECHNICAL FIELD

This invention relates to a fluid control circuit wherein a control valve thereof must be shifted to a reset position before the circuit can be made operational to drive an actuator, such as a hydrostatic transmission.

BACKGROUND ART

The advent of hydrostatic transmissions for use in construction vehicles and the like has given rise to the need for assuring that the transmission cannot be driven upon starting of an engine and with a control valve therefor placed in its "run" position. In order to satisfy this need, various types of mechanical linkages have been proposed for connection with the control valve to make certain that the control valve is reset to a vent position prior to placing the transmission in its running mode of operation and upon starting of the engine. Such linkages are somewhat complex and require finite setting to achieve such a reset function. In addition, the rather bulky control valve and associated hardware of the transmission control group are prone to leakage and cannot be compactly arranged for ready servicing within the vehicle. A typical transmission of the above type is disclosed in U.S. Pat. No. 3,952,514, issued to Cyril W. Habiger on Aug. 27, 1976, such patent being assigned to the assignee of this application.

DISCLOSURE OF THE INVENTION

The present invention is directed to overcoming one or more of the problems as set forth above.

A control circuit comprises a fluid source connected to a control valve which is movable between first and second positions for selectively communicating pressurized fluid to an actuator. The source, control valve, and actuator are interconnected by means for sequentially (A) preventing communicating of the source with the actuator when the control valve is maintained in its first position, (B) communicating the source with the actuator when the control valve is moved from its first position to its second position, and (C) preventing communication of pressurized fluid from the source to the actuator when the source is deactivated and then reactivated with the control valve being maintained in its second position whereby the control valve must be first returned to its first position and then moved to its second position before pressurized fluid can be communicated to the actuator.

In one aspect of this invention, the above means includes three separate valves each movable between first and second positions and interconnected between the source, control valve, and actuator to effect the above functions. In another aspect of this invention, an additional control valve functions to selectively override the above means when the first-mentioned control valve is maintained in its first position to prevent communication between the source and the actuator.

The control circuit of this invention thus provides a compact system which avoids the need for sophisticated linkage systems to effect a reset mode of operation, exhibits a low propensity for leakage and which is readily adapted to be mounted at a convenient location on a vehicle.

BRIEF DESCRIPTION OF THE DRAWINGS

FIG. 1 schematically illustrates a control circuit embodiment of the present invention, as shown in a vent mode of operation;

FIG. 2 illustrates the control circuit in a running mode of operation; and

FIG. 3 illustrates the control circuit in an override mode of operation.

BEST MODE FOR CARRYING OUT THE INVENTION

General Description

FIG. 1 illustrates a fluid (hydraulic) control circuit 10 comprising a fluid source means 11, including an engine-driven, positive displacement pump 12, adapted to selectively communicate pressurized fluid to an actuator 13. The actuator may comprise a standard control valve and pump of a hydrostatic transmission or other fluid actuated device, such as a hydraulic cylinder. Pressurized fluid from source 11 is selectively communicated to actuator 13, upon activation of pump 12, under control of a control valve means 14, shown in the form of a two-position directional control valve. The control valve means comprises a spool 15 normally biased to its illustrated first or vent position by a coil spring 16 and movable to a second position for operation of the control circuit.

A first relay valve means 17 is connected to source 11 and also to control valve means 14 to be moved from a first position to its second position, illustrated in FIG. 1, when the control valve means is maintained in its illustrated vent position and pump 12 is activated. Although pressurized fluid from source 11 is free to flow through valve means 17, it is blocked at a second relay valve means 18 and also at a third relay valve means 19. Thus, pressurized fluid cannot be communicated to actuator 13 when control valve means is maintained in its first or vent position of operation (FIG. 1).

However, when control valve means 14 is moved to its FIG. 2 second position, pressurized fluid will communicate sequentially through second relay valve means 18 and first relay valve means 17 to open third relay valve means 19 whereby pressurized fluid will be communicated to the actuator from source 11, directly through the third relay valve means. During this mode of operation, first relay valve means 17 will slowly "bleed-down" to close off communication of source 11 with second relay valve means 18, but since pressurized fluid is being communicated directly to third relay valve means 19 from source 11, the third servo valve means will remain open, as will be hereinafter more fully described in detail.

It will become more fully apparent from the following detailed description of control circuit 10 that the circuit cannot be made operational to drive actuator 13 upon starting of the engine driving pump 12 and when control valve means 14 is in its FIG. 2, operational position, i.e., the control valve means must be first shifted to its FIG. 1 reset position. A second control valve means 20, shown in the form of a two-position directional control valve similar to control valve means 14, provides an override function to selectively close third relay valve means 19 to vent the circuit, as also described more fully hereinafter.

DETAILED DESCRIPTION

FIG. 1 illustrates fluid control circuit 10 in a vent mode of operation wherein control valve means 14 is maintained by spring 16 in its first or vent position to prevent communication of pressurized fluid to actuator 13. Pressurized fluid from pump 12 will thus communicate through the control valve means via lines 21, 22 and 23 to act on the left end of a spool 24 of first servo valve means 17 to move it to its illustrated second, open position from its first, closed position. The spool is biased leftwardly by a spring 25 to normally move the spool fully leftwardly to its closed position (FIG. 2) when line 23 is exhausted of pressurized fluid to thereby block communication between line 21 and a line 26, on the downstream side of first servo valve means 17.

It should be noted that pressurized fluid in line 23 flows through a restricted orifice 27 and a passage 28, formed in spool 24, which has a restricted orifice 29 therein. Thus, in both the open and closed positions of first relay valve means 17, pressurized fluid will be metered to a tank, schematically illustrated at 30. It should be further noted in FIG. 1 that a spool 31 of second relay valve means 18 blocks communication of pressurized fluid from line 26 to a line 32 on the downstream side of second relay valve means 18 whereas a spool 33 of third relay valve means 19 blocks communication of pressurized fluid from a line 34, connected to line 21, to a line 35 positioned on a downstream side of the third valve means.

Thus, when control valve means 14 is maintained in its vent position illustrated in FIG. 1, no pressurized fluid can be communicated to actuator 13. As will be described more fully hereinafter, when the engine (not shown) is shut down to deactivate pump 12 and the engine is then restarted to reactivate the pump, control valve means 14 must be returned to its FIG. 1 relay position before pressurized fluid can be communicated to actuator 13. This reset feature will thus prevent the operator from communicating pressurized fluid to actuator 13 upon restarting of the engine and when control valve means 14 is maintained in its operational position illustrated in FIG. 2.

FIG. 2 illustrates fluid control circuit 10 in its running mode of operation wherein control valve means 14 has been moved by the operator to its operational position whereby pressurized fluid is communicated from pump 12 to second relay valve means 18 via lines 21 and 22 and a line 36. Simultaneously therewith, first relay valve means 17 will slowly bleed-down to its illustrated closed position under the control of restricted orifices 27 and 29. Pressurized fluid communicated to the left end of spool 31 of second relay valve means 18 will move the spool rightwardly to its FIG. 2 position to thereby connect line 26 with line 32. It should be noted that when spool 31 is maintained in its closed position by a coil spring 37, as illustrated in FIG. 1, that line 36 is exhausted to tank 30 via a passage 38, having a restricted orifice 39 therein, formed in spool 31. However, when second relay valve means 18 is pressurized to move it to its open position illustrated in FIG. 2, communication between line 36 and tank 30 is blocked.

When second relay valve means 18 is maintained in its open position illustrated in FIG. 2, pressurized fluid communicated therethrough from line 26 will further communicate to line 32 and through first relay valve means 17 and into a line 40. Pressurized fluid in line 40 flows through a restricted orifice 41 therein and to the left end of third relay valve means 19. Pressurized fluid acting on the left end of spool 33 of third relay valve means 19 will thus move the spool from its first, closed position (FIG. 1) to its second, open position, illustrated in FIG. 2, and against the opposed biasing force of a coil spring 42. When third relay valve means 19 is maintained in its closed position illustrated in FIG. 1, line 40 will be vented to tank 30 via a passage 43, having a restricted orifice 44 therein, formed in spool 33.

However, when third relay valve means 19 is maintained in its open position illustrated in FIG. 2, communication of line 40 with tank 30 will be blocked. With third relay valve means 19 thus maintained in its open position, pressurized fluid from pump 12 will be communicated to actuator 19 via lines 21, 34, 35 and 40. Since line 35 also communicates pressurized fluid to the left end of spool 33, via a restricted orifice 45 in line 40, the third relay valve means 19 will be maintained in its open position, illustrated in FIG. 2, even though first relay valve means 17 has now bled-down to return to its illustrated closed position.

During communication of pressurized fluid to actuator 13 as above described, a spool 46 of control valve means 20 is normally maintained in its first, closed position under the biasing force of a coil spring 47. However, should the operator decide to override the circuit to close third relay valve means 19, he need only move control valve means 20 to its second, open position, illustrated in FIG. 3, whereby pressurized fluid in line 40 is vented to tank 30. Thus, spool 33 will be positioned to block communication of pressurized fluid from line 34 to line 35 and actuator 13.

INDUSTRIAL APPLICABILITY

The above-described fluid control circuit 10 is particularly adapted to selectively supply pressurized fluid to the pumps employed in a hydrostatic transmission of the type used in track-type vehicles, such as track-type tractors.

Assuming the vehicle's engine is shut down to deactivate pump 12, control valve means 14 must be moved to its FIG. 1 first position by the operator before actuator or hydrostatic transmission 13 can be actuated. This reset feature thus prevents the operator from charging the hydrostatic transmission with pressurized fluid when control valve means 14 is maintained in its second position illustrated in FIG. 2, upon starting of the engine to activate pump 12. As suggested in FIG. 2, should the operator attempt the same, first relay valve means 17 will remain in its illustrated closed position whereby communication of pressurized fluid from line 21 to line 26 will be blocked by spool 24 to prevent further communication of the fluid to the left end of spool 33 of third relay valve means 19 via lines 32 and 40. Spool 33 will thus remain in its closed position (FIG. 1) to block communication of pressurized fluid from line 34 to line 35 and transmission 13.

However, when the operator resets control valve means 14 to its first or vent position illustrated in FIG. 1, spool 24 of first relay valve means 17 will move rightwardly, as described above, since pump pressure is communicated to the left end thereof via lines 22 and 23. Orifice 29 is suitably sized to maintain the spool in its illustrated open position for a sufficient length of time upon movement of control valve means 14 to its second position, illustrated in FIG. 2, to communicate pressurized fluid to hydrostatic transmission 13.

Still referring to FIG. 2, communication of pressurized fluid from pump 12 to the left end of spool 31 of second relay valve means 18, via lines 22 and 36, will connect line 26 with line 32. Since first relay valve means 17 is slowly bleeding-down, line 21 will connect with line 26 for a predetermined length of time prior to a full closing of first relay valve means 17. Pressurized fluid thus communicates to the left end of spool 33 of third relay valve means 19 via lines 21, 26, 32 and 40 to move the third relay valve means to its open position in FIG. 2. Line 34 will thus connect with line 35 to communicate pressurized fluid from pump 12 to hydrostatic transmission 13 directly. Simultaneously therewith, pressurized fluid will be communicated to line 40 which takes-over the function of maintaining spool 33 in its FIG. 2, open position upon the subsequent full bleed-down of first relay valve means 17 to close the same.

Should the operator desire to override the operational mode of the circuit (FIG. 2), he need only actuate control valve means 20 to move it to its open position, illustrated in FIG. 3, whereby pressurized fluid in line 40 will be vented to tank 30 therethrough. Spool 33 of third relay valve means 19 is responsively moved to its closed position by spring 42 whereby the spool will block communication of line 34 with line 35 and actuator 13. In order to reactivate the hydrostatic transmission, control valve means 20 must be returned to its closed position and control valve means 14 reset to its vent position (FIG. 1), as above described.

From the above description, it can be seen that the control circuit embodying this invention provides a relatively non-complex and compact system for providing the above-described reset function. In a conventional hydrostatic transmission application, mechanical linkage systems requiring finite calibration to effect the reset function, are eliminated to further reduce the complexity of the integrated system. In addition, since the various valves employed in the control circuit of this invention are relatively small in comparison to corresponding valves employed in other conventional systems, the cost factor is substantially reduced along with any potential leakage problems. The compactness of the control group comprising the control circuit also lends itself to mounting at a convenient and readily accessible location on the vehicle for servicing purposes and the like.

What is claimed is:

1. A fluid control circuit (10) comprising:
   fluid source means (11) for being placed in a deactivated or activated condition of operation for discharging pressurized fluid therefrom upon activation thereof,
   control valve means (14), including a single two-position directional control valve, for movement between first and second positions and connected to said source means for receiving pressurized fluid therefrom,
   an actuator (13),
   relay means (17,18,19), interconnecting said source means (11), said control valve (14), and said actuator (13), for requiring return of said control valve to its first position and then movement to its second position before pressurized fluid can be communicated to said actuator from said fluid source means by sequentially (A) preventing communication of pressurized fluid from said source means to said actuator upon activation of said source means and when said control valve means is maintained in its first position, (B) communicating pressurized fluid from said source means to said actuator upon continued activation of said source means and when said control valve means is moved from its first position to its second position, and (C) preventing communication of pressurized fluid from said source means to said actuator when said source means is deactivated and then reactivated with said control valve means being maintained in its second position, and
   additional control valve means (20) for selectively overriding said relay means, when said first-mentioned control valve means is maintained in its second position, for preventing communication of pressurized fluid from said source means to said actuator.

2. The control circuit of claim 1 wherein said relay means comprises first relay valve means (17) movable between first and second positions and connected to said source means and further connected to said control valve means for receiving pressurized fluid from said control valve means to move said first relay valve means from its first position to its second position when said control valve means is maintained in its first position and for simultaneously permitting fluid flow therethrough from said source means.

3. The control circuit of claim 2 wherein said relay means further comprises second relay valve means (18) movable between first and second positions and connected to said control valve means and further connected to said first relay valve means for receiving pressurized fluid from said control valve means to move said second relay valve means from its first position to its second position when said control valve means is maintained in its second position and for simultaneously communicating pressurized fluid through said first relay valve means when said first relay valve means is maintained in its first position.

4. The control circuit of claim 3 wherein said relay means further comprises third relay valve means (19) movable between first and second positions and connected to said first relay valve means and further connected to said source means for receiving pressurized fluid from said first relay valve means to move said third relay valve means from its first position to its second position when said control valve means is maintained in its second position and for simultaneously communicating pressurized fluid from said source means through said third relay valve means and to said actuator.

5. The control circuit of claim 4 wherein said first relay valve means comprises bleed-down means (29) for gradually permitting said first relay valve means to move from its second position to its first position to prevent communication of pressurized fluid sequentially from said source means to said second relay valve means, through said first relay valve means, when said control valve means is maintained in its second position.

6. The control circuit of claim 5 wherein said first, second and third relay valve means cooperate, when said control valve means is maintained in its second position, to initially communicate pressurized fluid from said first relay valve means to said third relay valve means to maintain said third relay valve means in its second position and then communicate pressurized fluid through said third relay valve means in its second position and then communicate pressurized fluid through said third relay valve means and back to said third relay valve means to maintain said third relay valve means in its second position when said first relay valve means has moved from its second position to its first position blocking communication of pressurized fluid from said source means through said first relay relay valve means.

7. The control circuit of claim 1 wherein said actuator comprises a fluid motor transmission.

8. The control circuit of claim 1 further comprising additional control valve means (20) for selectively overriding said relay means, when said first-mentioned control valve means is maintained in its second position, for preventing communication of pressurized fluid from said source means to said actuator.

9. A control circuit comprising:
   a pressurized fluid source (11),
   first valve means (14) movable between first and second positions and connected to said source for receiving pressurized fluid therefrom,
   second valve means (17) movable between first and second positions and connected to said source and further connected to said first valve means for receiving pressurized fluid from said first valve means to move said second valve means from its first position to its second position when said first valve means is maintained in its first position and for simultaneously permitting fluid flow therethrough from said source,
   third valve means (18) movable between first and second positions and connected to said first valve means and further connected to said second valve means for receiving pressurized fluid from said first valve means to move said third valve means from its first position to its second position when said first valve means is maintained in its second position and cooperating with said second valve means for simultaneously communicating pressurized fluid through said second valve means when said second valve means is maintained in its first position, and
   fourth valve means (19) movable between first and second positions and connected to said second valve means and further connected to said source for receiving pressurized fluid from said second valve means to move said fourth valve means from its first position to its second position when said first valve means is maintained in its second position and for simultaneously communicating pressurized fluid from said source through said fourth valve means.

10. The control circuit of claim 9 wherein said first valve means comprises a two-position directional control valve (14).

11. The control circuit of claim 9 wherein said second valve means comprises a sequence valve (17).

12. The control circuit of claim 9 wherein said second valve means comprises bleed-down means (29) for permitting gradual movement thereof from its second to its first position when said first valve means is maintained in its second position.

13. The control circuit of claim 12 wherein said bleed-down means causes said second valve means to gradually move from its second position to its first position, when said first valve means is maintained in its second position, to initially communicate pressurized fluid from said source through each of said second and third valve means and to said fourth valve means to maintain said fourth valve means in its second position and for thereafter blocking communication of pressurized fluid from said source through said second valve means and for simultaneously permitting communication of pressurized fluid from said source to said fourth valve means to maintain said fourth valve means in its second position.

14. The control circuit of claim 9 further comprising an actuator (13) connected to said fourth valve means to receive pressurized fluid therefrom when said first valve means is maintained in its second position.

15. The control circuit of claim 9 further comprising fifth valve means (20) for selectively permitting said fourth valve means to move to its second position to prevent communication of pressurized fluid from said source and through said fourth valve means when said first valve means is maintained in its second position.

16. The control circuit of claim 15 wherein said fifth valve means comprises a two-position directional control valve (20).

* * * * *